(12) United States Patent
Riquelme

(10) Patent No.: US 11,123,818 B2
(45) Date of Patent: Sep. 21, 2021

(54) WELDING OF STEEL BLANKS

(71) Applicant: AUTOTECH ENGINEERING S.L., Amorebieta-Etxano (ES)

(72) Inventor: Antoine Riquelme, Santa Oliva (ES)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 578 days.

(21) Appl. No.: 15/518,747

(22) PCT Filed: Oct. 14, 2015

(86) PCT No.: PCT/EP2015/073821
§ 371 (c)(1),
(2) Date: Apr. 12, 2017

(87) PCT Pub. No.: WO2016/059130
PCT Pub. Date: Apr. 21, 2016

(65) Prior Publication Data
US 2017/0232555 A1    Aug. 17, 2017

(30) Foreign Application Priority Data
Oct. 15, 2014    (EP) .................................... 14382394

(51) Int. Cl.
*B23K 26/26* (2014.01)
*B23K 37/04* (2006.01)
(Continued)

(52) U.S. Cl.
CPC ............ *B23K 26/26* (2013.01); *B23K 26/322* (2013.01); *B23K 37/0408* (2013.01);
(Continued)

(58) Field of Classification Search
CPC ........ B23K 26/26; B23K 26/32; B23K 37/04; B23K 2101/006; B23K 2101/185;
(Continued)

(56) References Cited

U.S. PATENT DOCUMENTS 2,138,864 A * 12/1938 Karasick .............. B23O 3/1543
335/289
3,400,243 A * 9/1968 McNabb ................ B23K 15/06
219/121.13
(Continued)

FOREIGN PATENT DOCUMENTS

CN    1943969 A    4/2007
DE    19732008 A1    2/1999
(Continued)

OTHER PUBLICATIONS

Ambrosy, et al.: "The use of electromagnetic body forces to enhance the quality of laser welds", Proceedings of SPIE vol. 5120 XIV International Symposium On Gas Flow, Chemical Laswers, and High-Power Lasers, Feb. 7, 2003, pp. 596-600, 5 pages.

*Primary Examiner* — Dana Ross
*Assistant Examiner* — Ket D Dang
(74) *Attorney, Agent, or Firm* — Squire Patton Boggs (US) LLP

(57) ABSTRACT

Method for joining a first and a second steel blanks, at least one of the blanks comprising aluminium. The method comprises providing a support being made of a magnetic material for each blank, the supports being arranged distanced apart by a central space; providing a coil winding around one support, arranging the first blank on one support and the second blank on the other support, such that a butt end of the first blank that is facing the second blank is brought into contact with a butt end of the second blank that is facing the first blank defining a contacting area that closes a path for magnetic flux. The method further comprises applying a laser beam onto the contacting area, while applying an alternating current to the coil winding, wherein an alternating magnetic field is created across the contacting area in a direction substantially in-line with the blanks.

11 Claims, 3 Drawing Sheets

(51) Int. Cl.
*B23K 26/322* (2014.01)
*B23K 101/00* (2006.01)
*B23K 101/34* (2006.01)
*B23K 101/18* (2006.01)
*B23K 103/08* (2006.01)

(52) U.S. Cl.
CPC .. *B23K 2101/006* (2018.08); *B23K 2101/185* (2018.08); *B23K 2101/34* (2018.08); *B23K 2103/08* (2018.08)

(58) Field of Classification Search
CPC ............ B23K 2101/34; B23K 2103/08; B23K 26/322; B23K 37/0408
USPC .......................... 219/121.6–121.86; 228/49.4
See application file for complete search history.

(56) References Cited

U.S. PATENT DOCUMENTS

| | | | | |
|---|---|---|---|---|
| 3,566,071 | A * | 2/1971 | Matchett | H01J 37/3007 219/121.14 |
| 3,585,350 | A * | 6/1971 | Voytko | B23K 28/02 219/121.63 |
| 5,023,427 | A * | 6/1991 | Neiheisel | B23K 26/26 219/121.82 |
| 5,951,903 | A * | 9/1999 | Isoyama | B21B 15/0085 219/603 |
| 6,054,675 | A * | 4/2000 | Kurokawa | B23K 35/0261 148/22 |
| 6,600,133 | B2 * | 7/2003 | Watanabe | B23K 9/0043 219/125.1 |
| 2008/0026247 | A1 * | 1/2008 | Nakagawa | B23K 11/115 428/649 |
| 2009/0134132 | A1 * | 5/2009 | Verna | B23K 26/1476 219/121.64 |
| 2009/0220815 | A1 * | 9/2009 | Canourgues | B23K 9/23 428/583 |
| 2014/0270922 | A1 * | 9/2014 | Evangelista | B23K 26/0006 403/270 |
| 2015/0306702 | A1 * | 10/2015 | Breuer | C22C 38/002 219/121.64 |
| 2016/0045970 | A1 * | 2/2016 | Garcia | B23K 26/322 219/121.64 |
| 2016/0332256 | A1 * | 11/2016 | Gu | B23K 26/60 |
| 2017/0120391 | A1 * | 5/2017 | Schmit | B23K 26/26 |

FOREIGN PATENT DOCUMENTS

| | | | | |
|---|---|---|---|---|
| DE | 10225781 A1 | 3/2004 | | |
| DE | 102007028956 A1 | 12/2008 | | |
| DE | 102008006624 A1 * | 7/2009 | ........... | B23K 11/163 |
| DE | 102010018354 A1 | 10/2011 | | |
| EP | 2737971 A1 | 6/2014 | | |
| IT | 1057579 * | 12/2000 | ............. | B23K 26/26 |
| JP | S 61-053086 U | 4/1986 | | |
| JP | 2008/055446 A | 3/2008 | | |

* cited by examiner

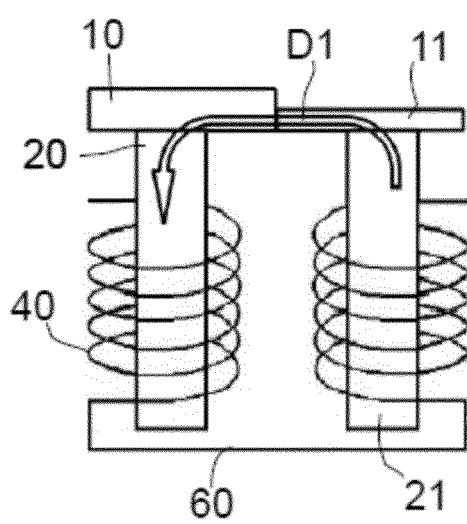
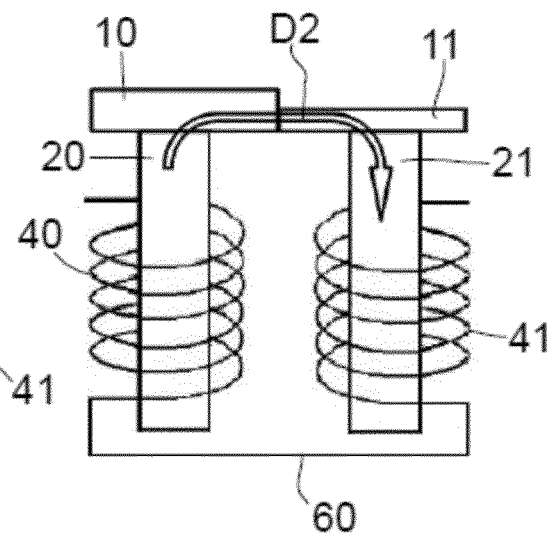
FIG. 4a　　　　　FIG. 4b
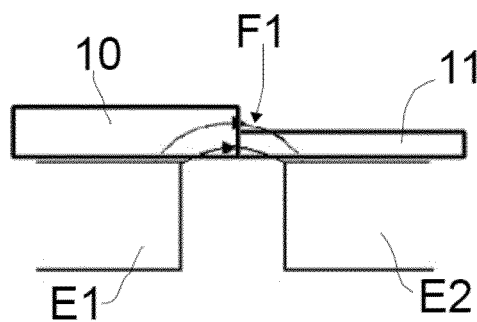
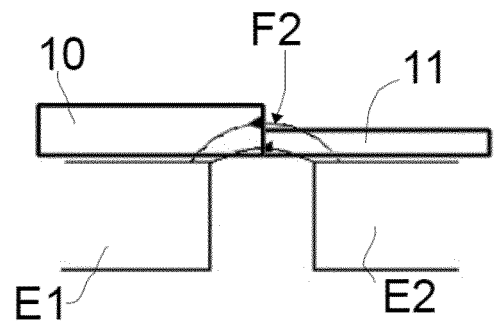
FIG. 5a　　　　　FIG. 5b

WELDING OF STEEL BLANKS

This application claims the benefit of European Patent Application EP14382394.6 filed on Oct. 15, 2014.

The present disclosure relates to methods for joining two steel blanks, and more particularly steel blanks comprising at least a layer of aluminum or of an aluminum alloy. The present disclosure further relates to tools for carrying these methods and to products obtained by or obtainable by any of these methods.

BACKGROUND

The demand for weight reduction in e.g. the automotive industry has led to the development and implementation of lightweight materials, manufacturing processes and tools. The growing concern for occupant safety also has led to the adoption of materials which improve the integrity of the vehicle during a crash while also improving the energy absorption. In that sense, vehicle parts made of high-strength and ultra-high-strength steel (UHSS) are often employed in order to satisfy criteria for lightweight construction.

Ultra-high-strength steels (UHSS) exhibit an optimized maximal strength per weight unit and advantageous formability properties. These steels are designed to attain a microstructure after heat treatment, which confers good mechanical properties and makes them especially suited for the hot stamping process typically used to form steel blanks into particular automobile parts. Some hot stamping processes use boron steel sheets to create stamped components with UHSS properties, with tensile strengths up to 1,500 MPa. The increase in strength as compared to other material allows for a thinner gauge material to be used, which results in weight savings over conventionally cold stamped mild steel components.

Typical vehicle components that can be made from UHSS using hot stamping include: door beams, bumper beams, cross/side members, A/B pillar reinforcements, and waist rail reinforcements.

In a further attempt to minimize the weight of components while respecting structural requirements, so-called "tailored blank" techniques may be used. In these techniques, components may be made from a composite metal blank which is obtained by welding "edge to edge" several blanks with different thicknesses, size and properties. At least theoretically, using this kind of technique the use of material may further be optimized. Blanks of different thickness may be joint or a steel blank may be joint with a coated steel blank for example, using the specific properties of each material where they are needed.

Similarly "patchwork" blanks are known, in which several blanks are not necessarily welded "edge-to-edge", but instead partial or complete overlaps of blanks may be used.

Since during the hot stamping process the blanks are subjected to aggressive atmospheres, the steel is usually coated to avoid corrosion, oxidation, decarburization and scale formation. 22MnB5 steel is usually presented with an aluminum-silicon coating. For example, Usibor® 1500P, commercially available from Arcelor, are boron alloyed steels coated with an aluminum-silicon (AlSi) coating and are examples of steels normally used in tailored and patchwork blanks.

Usibor® 1500P is supplied in ferritic-perlitic phase. It is a fine grain structure distributed in a homogenous pattern. The mechanical properties are related to this structure. After heating, a hot stamping process, and subsequent quenching, a martensite microstructure is created. As a result, maximal strength and yield strength increase noticeably.

The composition of Usibor is summarized below in weight percentages (rest is iron (Fe) and impurities):

| C | Si | Mn | P | S | Cr | Ti | B | N |
|---|----|----|----|----|----|----|----|----|
| 0.24 | 0.27 | 1.14 | 0.015 | 0.001 | 0.17 | 0.036 | 0.003 | 0.004 |

As mentioned before, Usibor 1500 is supplied with an aluminum-silicon (AlSi) coating in order to prevent corrosion and oxidation damage. However, this coating has a significant downside related to its weld behavior. If Usibor blanks are welded without any further measures, aluminum of the coating may enter into the weld area and this can cause an important reduction of the mechanical properties of the resulting component and increase the possibility of weak fracture in the weld zone.

In order to avoid or at least minimize this effect, it is known to remove part (or the whole) of the coating in an area close to the welding gap by laser ablation. However, this represents an additional step in the manufacturing process of a (tailored) blank and a vehicle component. Furthermore, this additional step requires a complex quality process with an elevated number of parts which are to be scrapped. This entails an increase of the cost of the welding step and limits the competitiveness of the technology in the industry.

Herein a blank may be regarded as an article which has yet to undergo one or more processing steps (e.g. deformation, machining, surface treatment or other). These articles may be substantially flat plates or have more complicated shapes.

DE102007028956 describes a method and apparatus for approximately horizontal welds with a welding gap.

EP2737971 describes tailor welded blanks being manufactured by connecting blanks of different materials or thickness, manufacturing methods thereof and hot stamped components using the same.

There is thus a need for methods of joining steel blanks having at least a layer of aluminum or of an aluminum alloy in which aforementioned disadvantages are avoided or at least partially reduced.

SUMMARY

In a first aspect, the disclosure provides a method for joining a first steel blank and a second steel blank wherein at least one of the first and second blanks comprises a layer of aluminum or of an aluminum alloy. The method comprises providing a support for each steel blank, the supports being made of a magnetic material and being arranged distanced apart by a central space provided between them. A coil winding is provided around at least one of the supports. The method further comprises arranging the first blank on one support and the second blank on the other support, such that a butt end of the first blank that is facing the second blank is brought into contact with a butt end of the second blank that is facing the first blank defining a contacting area that closes a path for magnetic flux between the supports and through the first and second blanks when in use, and providing a laser system, wherein the laser system comprises one or more optical elements and a laser source for generating a laser beam. And the method further comprises applying a laser beam onto the contacting area using the laser system, while applying an alternating current to the coil winding, such that an alternating magnetic field is created across the contacting area in a direction substantially from one blank to the other.

According to this aspect, by bringing the steel blanks in contact which are arranged on supports made of magnetic material (and arranged spaced apart), a potential path for magnetic flux is closed between the supports across the blanks. By applying alternating current to the coil winding an alternating magnetic field can be provoked in the support which traverses the steel blanks. The strength of the magnetic field is increased due to the winding of the coil around the magnetic support. The magnetic field applies or may be applied across the width of the blanks.

When the alternating magnetic field is applied simultaneously with the laser beam, the magnetic field traverses the blanks (across the width of the blanks, not moving along with the laser) when part of the blank (the contacting area) is in a liquid phase. The magnetic field may thus be considered substantially in-line with the blanks, when the blanks are substantially flat.

In general, the laser may be aimed substantially perpendicular to the blanks. The alternating magnetic field may thus generally be substantially perpendicular to the laser.

The presence of an alternate magnetic field in a liquid phase of a magnetic material involves reorganization of magnetic particles present in the liquid phase while non-magnetic particles do not notice any change. The strength of the alternating magnetic field may be such that it drags the magnetic particles. Or put in other words, the magnetic particles can be in continuing transverse rearrangement. On the contrary, non-magnetic particles are substantially indifferent to the alternating magnetic field thus remain still and fall by gravity. Aluminum particles which are substantially non-magnetic particles are thus removed or at least partially removed from the contacting area thus enhancing mechanical properties of the welding.

There is thus no need to remove an aluminum or aluminum alloy layer, such as was proposed in some prior art methods when e.g. coated steel blanks are to be welded. This leads to quicker and cheaper manufacturing process since an intermediate process step is not necessary anymore.

Aluminum alloys are herein to be understood as metal alloys in which aluminum is the predominant element.

In some examples, the first blank and/or the second blank may be made from a boron alloyed steel coated with aluminum silicon, e.g. Usibor blanks.

The methods hereinbefore described may be used for forming e.g. tailored blanks, by butt joining two blanks. One of the blanks or both blanks may comprise a steel substrate with a coating comprising a layer of aluminum or an aluminum alloy. In particular an AlSi coating may be used. Other examples include the use of Ductibor blanks.

In a second aspect, the present disclosure provides a tool for joining a first steel blank and a second steel blank, wherein at least one of the first and second blanks comprises a layer of aluminum or of an aluminum alloy. The tool may comprise a first support for supporting the first blank and a second support for supporting the second blank, wherein the first and second supports are made of a magnetic material and are arranged distanced apart by a central space provided between them. The tool may further comprise a first coil winding provided around any of the first and second supports. A second coil winding may further be provided around the other of the first and second supports. The first and second coil windings may be arranged such that when alternating current is applied to them the magnetic fields generated are inverted.

In a third aspect, the present disclosure provides a method for forming a product. The method comprises forming a blank including a method of joining a first and a second steel blank in accordance with any of the herein described methods and subsequently heating the blank, and hot deforming of the heated blank and final quenching. Heating may include heat treatment in a furnace prior to deformation. Hot deforming may include e.g. hot stamping or deep drawing.

And in a further aspect another method for joining a first steel blank and a second steel blank, wherein at least one of the first and second blanks comprises a layer of aluminum or of an aluminum alloy is provided. The method comprises providing a source of an alternating magnetic field, providing the first blank and the second blank such that a butt end of the first blank is facing the butt end of the second blank such that a weld line is defined along the butt ends of the first and second blanks that are to be welded. The method further comprises providing a laser system, wherein the laser system comprises one or more optical elements and a laser source for generating a laser beam; applying a laser beam onto the weld line using the laser system and substantially simultaneously activating the source of the alternating magnetic field that produces a magnetic flux across the weld line in a direction substantially from one blank to the other, wherein the magnetic field is such that aluminium elements fall, whereas magnetic elements do not fall.

In further aspects, the present disclosure provides blanks and products as obtained by or obtainable by any of the methods substantially as hereinbefore described.

BRIEF DESCRIPTION OF THE DRAWINGS

Non-limiting examples of the present disclosure will be described in the following with reference to the appended drawings, in which:

FIGS. 4a-4b show a still further example of a tooling for joining steel blanks with aluminium layer; and FIGS. 5a-5b show yet another example of tooling for joining steel blanks with aluminium layer.

DETAILED DESCRIPTION OF EXAMPLES

Figure 1:
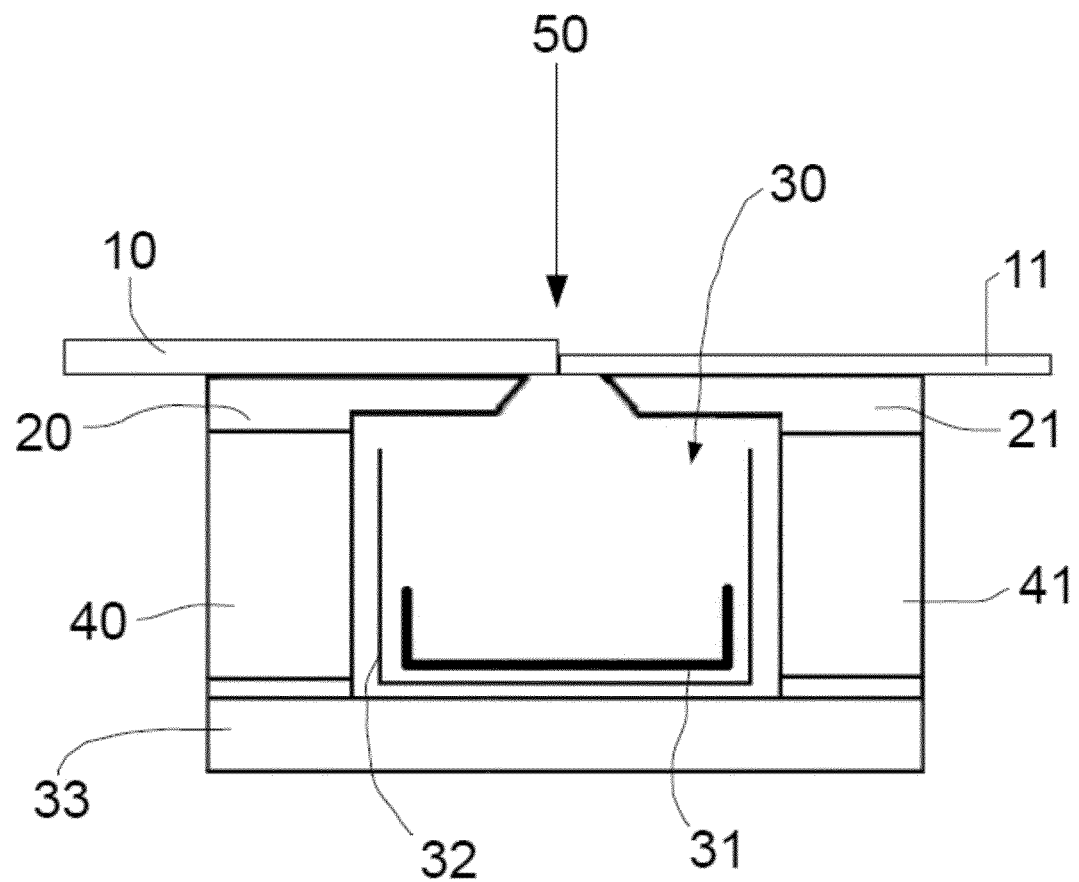
FIG. 1 schematically illustrates a tool for joining a first and a second steel blanks according to an example.

FIG. 1 schematically illustrates a portion of a tool for carrying out a method for joining a first steel blank 10 and a second steel blank 11. In this example, the two blanks are to be butt-jointed, i.e. using an edge-to-edge welding. Further in this example, both blanks may be made from boron alloyed coated steel, such as e.g. Usibor® 1500P and may have different thickness. In alternative examples, other steel blanks may be used. In further alternatives both blanks may have the same thickness.

The tool may comprise a first table 20 for supporting the first blank 10 and a second table 21 for supporting the second blank 11. The first and second tables may be made of steel or any other magnetic or magnetisable material. The tables 20 and 21 may be arranged distanced apart by a central space 30 provided between them. In the illustrated example, the two blanks are arranged substantially in the same plane. In further non-illustrated examples, the blanks could be arranged forming an angle between them.

When carrying out hereinbefore described methods for joining two blanks, once the blanks are arranged on the tables made of a magnetic material and once the blanks are brought into contact with each other, a possible path of magnetic flux is closed between the tables and through the blanks. A further possible path of magnetic flux may also be closed between the tables and a lower base 33 of the tool that may be placed in contact with a lower side (opposite to the side on which the blanks are supported) of the tables 20, 21. In these cases, the lower base 33 may be made of a magnetic or magnetisable material.

A first coil winding 40 may be provided around the first table 20 and a second coil winding 41 may be provided around the second table 21. In this example, care should be taken when alternating current is applied to both coil windings 40, 41 such that the generated magnetic fields are inverted. A North and South pole will thus be created on opposite sides in the two coils. Thus effectively a magnetic flux path can be formed from North to South through the blanks and from North to South through the lower side of the supports.

FIGS. 2a to 4b show more examples of tools for joining blanks comprising an aluminum layer. In the examples shown in these figures, the same reference signs have been used to designate matching elements. In these examples, the blanks are to be butt-jointed and the blanks may have different thickness as in the example of FIG. 1. In further non-illustrated examples, the blanks may have the same thickness and/or could be arranged forming an angle between them.

Figure 2A:
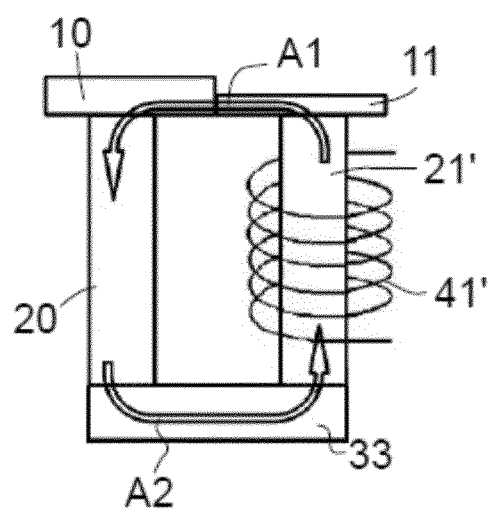
FIGS. 2a-2b show another example of a tooling for joining steel blanks with aluminium layer.
Figure 2B:
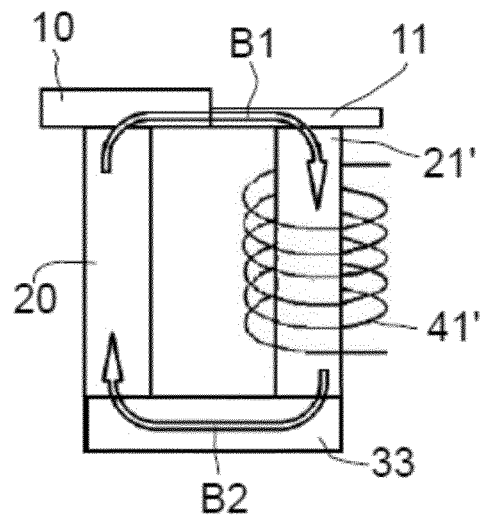

The example of FIGS. 2a-2b differs from that of FIG. 1 in that a single coil winding 41' may be provided around e.g. the second table 21'. In further examples, the single coil could be provided around any of the first or second tables 20', 21' as long as an alternating current is to be applied to the coil winding to generate an alternating magnetic field. In these examples, the lower base 33 may also be provided in contact with a lower side (opposite to the side on which the blanks are supported) of the tables 20, 21' as explained in connection with the example of FIG. 1. The lower base 33 may be made of a magnetic or magnetisable material. In these cases, when alternating current is applied to the single coil 41' a North and South pole will be created on opposite sides of the coil 41'. The path for magnetic flux can thus be represented by arrows A1, A2, B1 and B2, depending on the flow of electric charge that periodically reverses its direction and that produces the magnetic field. The path for magnetic flux may thus be closed between the tables 20; 21' through the blanks 10, 11 (arrows A1 and B1) and through the lower base 33 (arrows A2 and B2).

Figure 3A:
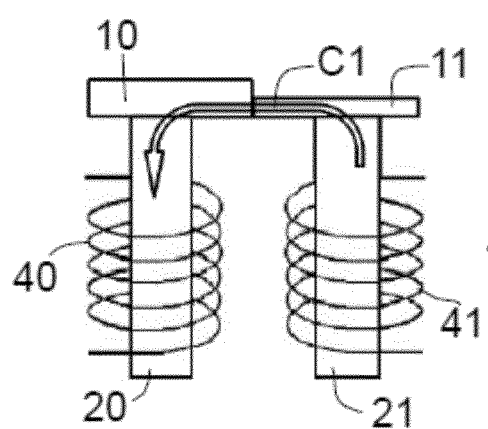
FIGS. 3a-3b show a further example of a tooling for joining steel blanks with aluminium layer.
Figure 3B:
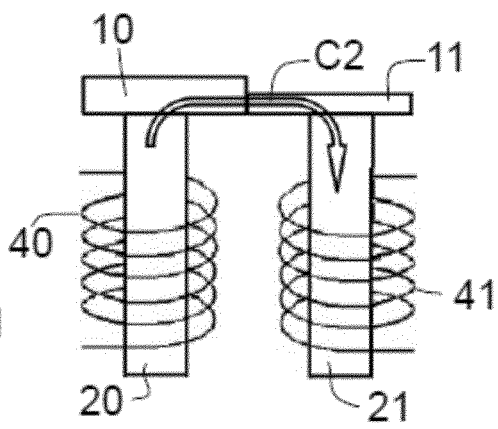

The example of FIGS. 3a-3b differs from that of FIG. 1 in that no lower base is provided between the tables 20, 21. In these examples, similarly to the example of FIG. 1, care should be taken when alternating current is applied to the coil windings 40, 41 so that the generated magnetic fields are inverted. This way, a North pole and a South pole will be created on opposite sides of the two coil windings 40, 41. The path for magnetic flux, represented by arrows C1 and C2, may thus depend on the flow of electric charge that periodically reverses its direction and that circulates through the coils producing the magnetic field. The path for magnetic flux may thus be formed between the tables 20; 21 through the blanks 10, 11 only (arrows C1 and C2).

The example of FIGS. 4a and 4b differs from that of FIGS. 3a and 3b in that the coil windings 40, 41 may be connected to each other by e.g. a connecting cable 60. The coils 40, 41 are thus connected in series such that only a North pole and a South pole is created at free ends of each coil winding 40, 41, when alternating current is applied. In these examples, the free ends 401, 411 may be provided facing the blanks 10, 11 and the connecting cable 60 may connect the other end of each coil. The magnetic flux path, represented by arrows D1 and D2, may also depend of the flow of electric charge that periodically reverses its direction and circulates through the coils so as to produce the magnetic field. The magnetic flux path may thus also be formed between the tables 20, 21 through the blanks 10, 11 only (arrows D1 and D2).

In further alternative examples, the first support (e.g. "table 20"), the second support (e.g. "table 21") and the lower base could be integrally formed.

In all cases, the tool may further comprise a laser welder having a laser head from which a laser beam (schematically shown with arrow 50) may exit. In this example, the laser system may be arranged such that the laser beam 50 impacts the blanks 10, 11 in a direction substantially perpendicularly to the blanks longitudinal direction. In alternative examples, the laser beam may impact the blanks in an inclined direction.

Optionally, a collector plate 31 may be provided in the central space 30 for collecting aluminium particles that may fall by gravity substantially as hereinbefore described once the alternating magnetic field is applied. In some of these cases, the collector plate may be made of steel. In some cases, it may be arranged on top of lower base 33.

In some examples, the tool may further comprise a clamp (not shown) associated with each upper side (on which the blanks are to be supported) of each table 20, 21, 21' and arranged such that in use each clamp presses a blank 10, 11 towards the table 20, 21, 21' on which it is supported.

In order to join the blanks, the laser beam heats up the edge portions of the blanks and melts the edge portions. Alternating current is applied to both coils such as to create alternating magnetic fields across the coils. The coils and currents are such that the magnetic field created in one coil is in an opposite direction to the magnetic field created in the other coil.

The magnetic field across the first coil (in the first support), the second coil (in the second support), the blanks and the base can thus form a closed circle, in which the direction of magnetic flux is constantly changing. The particles in the melted edge portions that are "magnetic" notice the constantly changing magnetic field and are continuously rearranged in accordance with it. The aluminium particles however are not affected by the magnetic field, i.e. they remain still thus falling from the weld zone. They may be collected in the collector plate 31.

In some examples, the frequency of the alternating current may e.g. be 50 or 60 Hz. This means that it is quite simple to implement as 50 or 60 Hz are normal frequencies of the electrical grid, depending on the geography.

FIGS. 5a and 5b show yet another example of tooling and methods for joining blanks comprising an aluminium layer. In the example shown in these figures, the same reference signs have been used to designate matching elements.

In this example, the blanks are to be butt-jointed and may have the same or different thickness. In further alternatives the blanks could be arranged forming an angle in between them.

In this example, two magnets E1, E2 may be arranged underneath each of the blanks 10, 11. Alternatively, a magnet, or a plurality of magnets may be arranged underneath each of the blanks. These magnets may be electromagnets.

In the shown example, the edges of the blanks 10, 11 to be joint by welding touch each other defining a weld line. In other examples, there may be a gap between the edges of the blanks. Such a gap may be filled by a suitable filler material to define the weld line.

The magnets may be arranged such that magnetic field lines of the magnetic field in the area of the weld line are arranged substantially perpendicular to the weld line. In the case of electromagnets, they may be connected either to a DC or AC source and may be arranged with their polarities inverted so as to generate magnetic fields (arrows F1, F2) that are inverted when in use (depending on the flow of charge periodically reverting its direction), thus creating a constantly changing direction magnetic flux through the blanks 10, 11, i.e. from arrows F1 to arrows F2 and vice versa.

In the weld zone, eddy currents may be created upon application of the laser and as a result of a changing magnetic field. The strength of the alternating magnetic field F1, F2 may be such that the Lorentz forces on magnetic elements or particles are sufficient to push the magnetic particles upwards when it traverses a liquid phase of the blanks 10, 11 (e.g. created by simultaneously application of laser heat). Aluminium particles that are substantially a-magnetic are not affected by these Lorentz forces. By doing this, aluminum particles may thus fall while the magnetic particles are being welded together. This means that two blanks comprising an aluminum layer can be welded together without an extra step of removing the aluminum.

To do this, the strength of the magnetic field is to be chosen carefully: strong enough to affect the magnetic elements/particles, but weak enough not to affect the aluminum particles/elements. The strength of the magnetic field can be controlled by controlling the current, the frequency of the alternating magnetic field, and e.g. the distance to the welding zone and the thickness of the blanks.

In the examples of FIGS. 2a-4b, the strength of the magnetic field may further depend on the number of windings of each coil.

In some examples, the tool may further comprise a protective plate 32 partially closing the central space, at least at the sides facing the tables with or without coil windings, in order to protect the coil windings from the magnetic field (electromagnet). The protective plate 32 may comprise a substantially C shape, the opening of the C facing the blanks 10, 11. In some cases, the protective plate may be made of steel.

In some examples, the laser system may comprise a laser with a power of between 3 kW and 16 kW, optionally between 4 and 10 kW. The power of the laser should be enough to melt the contacting area of the blanks. Preferably, the contacting area is melted along the entire thickness of the blanks such that the aluminum may be removed from the entire thickness as well.

The inventors have found that 3 kW-5 kW may be sufficient for melting typical blanks (typical thickness range of 0.7-4 mm). Increasing the power of the welder towards the upper part of the range may permit increasing the welding velocity.

The presence of an alternating magnetic field may increase the temperature generated by the laser on the blanks. This temperature increase may serve to reduce humidity and thus to improve the weld.

Optionally, a Nd-YAG (Neodymium-doped yttrium aluminium garnet) laser may be used. These lasers are commercially available, and constitute a proven technology. This type of laser may also have sufficient power to melt the zone of the blanks and allows varying the width of the focal point of the laser and thus of the weld zone. Reducing the size of the "spot" increases the energy density, whereas increasing the size of the spot enables speeding up the welding process. The weld spot may be very effectively controlled and various types of welding including twin spot welding and waiving spot welding may be possible with this type of laser. In some examples, a shielding gas such as helium or a helium based gas may be used. The flow rate of the shielding gas may e.g. be varied from 1 litre/min to 15 litres/min.

In alternative examples, a $CO_2$ laser with sufficient power may be used.

In some examples, welding may comprise twin spot welding. In twin spot welding, melting and welding take place simultaneously in two focal points. The two spots may be aligned parallel (parallel twin beam spots), or perpendicular (perpendicular twin beam spots) to, the direction of welding. Perpendicular twin spots bring a wider melting pool and at least in theory could produce a convection weld instead of a keyhole due to a wider heated area. Parallel twin spots (one behind the other) convey a lower thermal gradient during welding.

An aspect of parallel twin spot welding is that the thermal gradient to which the material is subjected is less. An aspect of perpendicular twin spot welding is that the weld zone is enlarged. Inventors have tested both these arrangements and have found that both can work in a satisfactory manner.

In some alternative examples, welding may comprise waiving spot welding. In waiving spot welding, the weld spot may be dynamically varied by oscillation of a mirror reflecting the laser.

In examples employing twin spot welding, the laser power may be equally or unequally divided between the two weld spots.

It may be seen that by using hereinbefore described tool for joining two steel blanks wherein at least one blank comprises a layer of aluminum or an aluminum allow there is no need for removing the aluminium layer prior to welding, thus simplifying and speeding up manufacture. This may bring about a substantial cost reduction.

A standard treatment for Usibor blanks would be to heat the obtained blank in e.g. a furnace to bring about (among others) austenizing of the base steel. Then the blank may be hot stamped to form e.g. a bumper beam or a pillar. During quenching after a hot deformation, a martensite microstructure which gives satisfactory mechanical characteristics may thus be obtained. The standard treatment is thus not affected in any manner by the methods for joining steel blanks proposed herein.

In all the examples illustrated herein so far, blanks in the shape of flat plates are joined together. The tailor welded blanks thus formed may undergo the same deformation and heat treatment described before. It should be clear that examples of the methods and tools herein disclosed may also be applied to blanks of different shapes.

In further examples, welding may further be done while supplying a metal powder to the contacting area. The metal powder may thus be mixed with the blanks in a liquid phase. In some of these cases, the metal powder may comprise an iron based powder comprising gammagenic elements. This metal powder may be used to cover imperfections in the blanks surfaces. In some cases, the metal powder may be brought through a tube in order to ensure a clean manufacturing process.

The metal powder may also serve to reduce the need for pressing the blanks together. When a gap exists between blanks, some tools (e.g. hydraulics) may generally be used to press the blanks together. Such tools can be costly to maintain however. If a gap between the blanks were too large (e.g. larger than 0.15 mm), laser welding could not be used.

By providing the metal powder, and thanks to the varying electromagnetic field, a bridge can be formed between the two blanks. This bridge of metal power can be maintained in between the blanks without falling because of the varying magnetic field. This thus can reduce the need for pressing the blanks together or may enable laser welding to be used in cases in which it was previously impossible.

In such cases, a sensor system may be arranged such as to measure a distance between the blanks. Metal powder could be selectively supplied as a function of the gap between blanks.

Further in these examples, particularly when an iron based powder which comprises gammagenic elements is used, it may be introduced in the weld zone and mixed with the melted aluminum if any aluminum remains. This may enhance mechanical properties after hot deformation processes such as hot stamping even if a bit of aluminum remains. The mixture of iron based powder comprising gammagenic elements with relatively little aluminum leads to obtaining austenite (gamma phase iron, γ-Fe) during heating. And, during quenching after a hot deformation, a martensite microstructure which gives satisfactory mechanical characteristics may thus be obtained.

Gammagenic elements are herein to be understood as chemical elements promoting the gamma-phase, i.e. the austenite phase. The gammagenic elements may be selected from a group comprising Nickel (Ni), Carbon (C), Cobalt (Co), Manganese (Mn) and Nitrogen (N). Other factors may also be taken into account for the composition of the metal powder, such as e.g. promoting hardness (Molybdenum (Mo) would be a suitable element) and/or corrosion resistance (in which case, Silicon (Si) and Chromium (Cr) would be suitable components).

The amount of gammagenic elements in the powder may be sufficient to compensate for the presence of alphagenic elements such as Cr, Mo, Si, Al and Ti (Titanium). Alphagenic elements promote the formation of alpha-iron (ferrite). This may lead to reduced mechanical properties as the microstructure resulting after hot stamping and quenching may comprise martensite-bainite in matrix and delta-ferrite.

In some examples, a grain size of the powder between 20 microns and 180 microns may be used, and optionally between 20 and 125 microns. Optionally, an average grain size of the powder may be between 45 and 90 microns, or between 50 and 80 microns. Inventors have found that these grain sizes may lead to enhanced penetration and mixture of the powder in the weld zone. Sufficient mixture throughout the complete weld zone enhances the mechanical properties of the final product.

In some examples, the iron based powder may have a composition in weight percentages of 0%-0.03% carbon, 2.0-3.0% of molybdenum, 10%-14% of nickel, 1.0-2.0% of manganese, 16-18% chromium, 0.0-1.0% of silicon, and the rest iron and impurities. Inventors have found that a powder of this mixture leads to very satisfactory mechanical properties and corrosion resistance of the final work product, i.e. after hot stamping and quenching.

After initial testing for proof-of-concept of melting the blanks and applying an alternating magnetic field, extensive testing was performed by the inventors to find out where specimens made from Usibor 1500 break. After welding, the resulting blanks underwent a "normal treatment", including hot deformation and quenching. After this, a test specimen for a standard tensile strength test was cut from the resulting product Results show that specimen breakage occurs outside the weld because the Ultimate Tensile Strength (UTS) in MPa in the weld zone was even higher than that of the original Usibor blanks used. This may be regarded as a particularly good performance, since it means that the weld area is stronger than the base material.

For reasons of completeness, various aspects of the present disclosure are set out in the following number of clauses:

Clause 1. A method for joining a first steel blank and a second steel blank, at least one of the first and second blanks comprising a layer of aluminum or of an aluminum alloy, the method comprising providing a source of an alternating magnetic field, providing the first blank and the second blank such that a butt end of the first blank is facing a butt end of the second blank such that a weld line is defined along the butt ends of the first and second blanks, providing a laser system, wherein the laser system comprises one or more optical elements and a laser source for generating a laser beam;

applying a laser beam onto the weld line using the laser system and substantially simultaneously activating the source of the alternating magnetic field that produces a magnetic flux across the weld line in a direction substantially from one blank to the other, wherein the magnetic field is such that aluminium elements fall whereas magnetic elements do not fall.

Clause 2. A method for joining a first steel blank and a second steel blank, at least one of the first and second blanks comprising a layer of aluminum or of an aluminum alloy, the method comprising providing a support for each steel blank, the supports being made of a magnetic material and being arranged distanced apart by a central space provided between them, providing a coil winding around one or more supports, arranging the first blank on one support and the second blank on the other support, such that a butt end of the first blank that is facing the second blank is brought into contact with a butt end of the second blank that is facing the first blank defining a contacting area that closes a path for magnetic flux between the supports and through the first and second blanks when in use, providing a laser system, wherein the laser system comprises one or more optical elements and a laser source for generating a laser beam;

applying a laser beam onto the contacting area using the laser system, while applying an alternating current to the coil winding such that an alternating magnetic field is created across the contacting area in a direction substantially from one blank to the other.

Clause 3. The method of clause 1, wherein providing a source of alternating current configured to produce an alternating magnetic field comprises providing a support for each steel blank, the supports being made of a magnetic material and being arranged distanced apart by a central space provided between them, and providing a coil winding around one or more supports, the coil winding and the supports being configured to provide a possible path for the magnetic flux, and wherein activating the source of alternating magnetic field comprises applying an alternating current to the coil winding.

Clause 4. The method of any of clauses 1-3, wherein the first blank and/or the second blanks is made from a boron alloyed steel coated with aluminum silicon.

Clause 5. The method of any of clauses 2-4, wherein each support is at least partially surrounded by a coil winding and the alternating current applied to each coil winding is such that the generated alternating magnetic fields are inverted.

Clause 6. The method of any of clauses 2-5, wherein a lower base made of a magnetic or magnetisable material is provided in contact with a lower side of the supports, the lower side of each support being opposite to a side of the support on which the first and second blanks are to be placed.

Clause 7. The method of any of clauses 2-6, wherein a collector plate is provided in the central space for collecting aluminum particles.

Clause 8. The method of any of clauses 2-7, wherein a frequency of the alternating current is 50 or 60 Hz.

Clause 9. The method of any of clauses 1-8, wherein the laser system is arranged such that the laser beam impacts substantially perpendicular to the blanks.

Clause 10. The method of any of clauses 1-9, wherein the laser system comprises a laser with a power of between 3 kW and 16 kW, optionally between 4 and 10 kW.

Clause 11. The method of clause 10, wherein welding comprises welding with an Nd-YAG laser.

Clause 12. A tool for joining a first steel blank and a second steel blank, at least one of the first and second blanks comprising a layer of aluminum or of an aluminum alloy, the tool comprising a first support for supporting the first blank and a second support for supporting the second blank, wherein the first and second supports are made of a magnetic material and are arranged distanced apart by a central space provided between them, wherein the tool further comprises a first coil winding provided around any of the first and second supports and a second coil winding provided around the other of the first and second supports, and the first and second coil windings being arranged such that when alternating current is applied to them the magnetic fields generated are inverted.

Clause 13. The tool of clause 12, further comprising a collector plate provided in the central space for collecting aluminium particles.

Clause 14. The tool of any of clauses 12-13, further comprising a clamp associated with each support arranged such that in use each clamp presses a blank towards a support.

Clause 15. A method for forming a product comprising
forming a blank including a method of joining a first and a second steel blanks according to any of the methods of claims 1-11,
heating the blank, and
hot deforming and subsequent quenching of the heated blank.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for joining a first steel blank and a second steel blank, at least one of the first or second steel blanks comprising a layer of aluminum or of an aluminum alloy, the method comprising:
providing a first support for the first steel blank and a second support for the second steel blank, the first and second supports being made of a magnetic material and being arranged distanced apart by a central space provided between them,
providing a first coil winding around the first support,
arranging the first blank on the first support and the second blank on the second support, such that a butt end of the first blank that is facing the second blank is brought into contact with a butt end of the second blank that is facing the first blank defining a contacting area that closes a path for magnetic flux between the first and second supports and through the first and second blanks when in use,
providing a laser system, wherein the laser system comprises one or more optical elements and a laser source for generating a laser beam;
applying the laser beam onto the contacting area using the laser system, while simultaneously
applying an alternating current to the first coil winding such that an alternating magnetic field is created across the contacting area in a direction from the first blank to the second blank,
thereby allowing non-magnetic aluminum particles to fall from a weld zone formed between the first blank and the second blank.

2. The method of claim 1, wherein the first steel blank and/or the second steel blank is made from a boron alloyed steel coated with aluminum silicon.

3. The method of claim 1, further comprising providing a second coil winding around the second support and applying an alternating current to the second coil winding such that an alternating magnetic field is created and the generated alternating magnetic fields by the first and second coils are inverted.

4. The method of claim 1, wherein a lower base made of a magnetic or magnetisable material is provided in contact with a lower side of the first and second supports, the lower side of each of the first and second supports being opposite to a side of the first and second supports on which the first and second blanks are to be placed.

5. The method of claim 1, wherein a collector plate is provided in a central space underneath the contacting area of the first and second blanks for collecting aluminum particles.

6. The method of claim 1, wherein a frequency of the alternating current is 50 or 60 Hz.

7. The method of claim 1, wherein the laser system is arranged such that the laser beam impacts perpendicular to the blanks.

8. The method of claim 1, wherein the laser system comprises a laser with a power of between 3 kW and 16 kW.

9. The method of claim 8, wherein the laser system comprises an Nd-YAG laser.

10. A method for forming a product comprising:
forming a blank including a method of joining a first and a second steel blanks according to the method of claim 1,
heating the blank, and
hot deforming and subsequent quenching of the heated blank.

11. The method of claim 1, wherein the laser system comprises a laser with a power of between 4 kW and 8 kW.

* * * * *